United States Patent
Esakki et al.

(10) Patent No.: US 10,024,692 B2
(45) Date of Patent: Jul. 17, 2018

(54) VARIABLE DIFFERENTIAL TRANSFORMER POSITION SENSOR WITH A TRAPEZOIDAL PRIMARY COIL

(71) Applicant: HONEYWELL INTERNATIONAL INC., Morristown, NJ (US)

(72) Inventors: Subramanian Esakki, Karnataka (IN); Paresh Sanchihar, Karnataka (IN); Vijayshekhar Araganji, Karnataka (IN); Kumaran Sena Narasimhan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 316 days.

(21) Appl. No.: 14/806,075

(22) Filed: Jul. 22, 2015

(65) Prior Publication Data

US 2016/0334245 A1    Nov. 17, 2016

(30) Foreign Application Priority Data

May 14, 2015    (IN) ............................ 1355/DEL/2015

(51) Int. Cl.
| | |
|---|---|
| *G01B 7/14* | (2006.01) |
| *G01D 5/22* | (2006.01) |
| *H01F 21/06* | (2006.01) |

(52) U.S. Cl.
CPC ........... *G01D 5/2291* (2013.01); *H01F 21/06* (2013.01)

(58) Field of Classification Search
USPC .......................... 324/207.15, 207.18, 207.24
See application file for complete search history.

(56) References Cited

U.S. PATENT DOCUMENTS

| | | |
|---|---|---|
| 3,054,976 A | 9/1962 | Lipshutz |
| 3,235,790 A | 2/1966 | Collins |
| 3,265,998 A | 8/1966 | Park |
| 3,950,696 A | 4/1976 | Miller et al. |
| 4,282,485 A | 8/1981 | Pauwels et al. |
| 5,861,791 A | 1/1999 | Schneider |
| 6,910,654 B2 | 6/2005 | Kawano et al. |
| 7,482,803 B2 | 1/2009 | Lee et al. |
| 7,719,263 B2 | 5/2010 | Eissner et al. |

(Continued)

FOREIGN PATENT DOCUMENTS

| | | |
|---|---|---|
| CH | 647316 A5 | 1/1985 |
| CN | 104240927 A | 12/2014 |

(Continued)

OTHER PUBLICATIONS

EP Application No. 16169073, European Search Report, dated Oct. 10, 2016, 9 pages.

*Primary Examiner* — Farhana Hoque
(74) *Attorney, Agent, or Firm* — Craige Thompson; Thompson Patent Law

(57) ABSTRACT

A transformer includes a bobbin, a primary coil, and a pair of secondary coils. The bobbin has an axial bore formed therein. The primary coil is wound on the bobbin and is adapted to be electrically excited with an excitation signal. The secondary coils are disposed adjacent to the primary coil, and are inductively coupled to the primary coil upon electrical excitation of the primary coil. The primary coil is wound on the bobbin such that at least a portion of the primary coil has a cross section shape that is a trapezoid.

20 Claims, 11 Drawing Sheets

(56) References Cited

U.S. PATENT DOCUMENTS

| | | |
|---|---|---|
| 7,969,268 B2 | 6/2011 | Dal Re et al. |
| 8,253,411 B2 | 8/2012 | Schmitt |
| 8,421,446 B2 | 4/2013 | Straubinger et al. |
| 2002/0033748 A1* | 3/2002 | Bolotinsky ............. H01F 30/16 336/182 |
| 2004/0080313 A1* | 4/2004 | Brosh ................... G01D 5/2291 324/207.18 |
| 2005/0046416 A1* | 3/2005 | Harris ................... G01D 5/2291 324/207.24 |
| 2008/0278149 A1 | 11/2008 | Gualtieri |
| 2008/0284554 A1 | 11/2008 | Schroeder et al. |
| 2012/0032768 A1 | 2/2012 | Fox et al. |
| 2013/0069475 A1 | 3/2013 | Ocket et al. |
| 2014/0203800 A1 | 7/2014 | Sasaki |

FOREIGN PATENT DOCUMENTS

| | | |
|---|---|---|
| CN | 104465044 A | 3/2015 |
| WO | 2009138098 A1 | 11/2009 |
| WO | 2010019932 A2 | 2/2010 |

* cited by examiner

VARIABLE DIFFERENTIAL TRANSFORMER POSITION SENSOR WITH A TRAPEZOIDAL PRIMARY COIL

CROSS-REFERENCE TO RELATED APPLICATION

This application claims the benefit of India Provisional Patent Application No. 1355/DEL/2015, filed May 14, 2015, which is incorporated herein by reference.

TECHNICAL FIELD

The present invention generally relates to transformer position sensors, and more particularly relates to a differential transformer position sensor with a trapezoidal primary coil.

BACKGROUND

Position sensors are included in various systems, devices, and environments. Moreover, various types of position sensors have been developed for inclusion into these various systems, devices, and environments. One particular type of position sensor that has been developed is the transformer position sensor. A transformer position sensor typically includes a primary coil, one or more secondary coils, and a movable magnetically permeable core. When the primary coil is electrically excited with an excitation signal, the secondary coil(s) is(are) inductively coupled to the primary coil and supplies an output signal that is based on the position of the movable core.

One particularly popular type of transformer position sensor is the variable differential transformer position sensor, which includes linear variable differential transformers (LVDTs) and rotary variable differential transformers (RVDTs). A variable differential transformer position sensor also includes a primary coil, a pair of secondary coils, and a movable magnetically permeable core. However, with variable differential transformer position sensors, the secondary coils are typically configured as a pair of differentially wound coils that may be electrically coupled in series.

The transformer position sensors described above are generally reliable and robust, but do suffer certain drawbacks. For example, the size, power consumption, and accuracy of presently known variable differential transformer position sensors do not meet the requirements for some end-use applications, most notably within the aerospace industry.

Hence, there is a need for a variable differential transformer position sensor that can readily meet the size, power consumption, and accuracy requirements associated with, for example, aerospace industry applications. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a transformer includes a bobbin, a primary coil, and a pair of secondary coils. The bobbin has an axial bore formed therein. The primary coil is wound on the bobbin and is adapted to be electrically excited with an excitation signal. The secondary coils are disposed adjacent to the primary coil, and are inductively coupled to the primary coil upon electrical excitation of the primary coil. The primary coil is wound on the bobbin such that at least a portion of the primary coil has a cross section shape that is a trapezoid.

In another embodiment, a linear variable differential transformer position sensor includes a bobbin, a core, a primary coil, and a pair of differentially wound secondary coils. The bobbin has an axial bore formed therein, and the core is movably disposed within the axial bore. The primary coil is wound on the bobbin and is adapted to be electrically excited with an excitation signal. The secondary coils are disposed adjacent to the primary coil, and each is inductively coupled to the primary coil upon electrical excitation of the primary coil. The primary coil is wound on the bobbin such that at least a portion of the primary coil has a cross section shape that is a trapezoid.

In yet another embodiment, a linear variable differential transformer position sensor includes a bobbin, a core, a primary coil, a pair of differentially wound secondary coils, and a housing. The bobbin has an axial bore formed therein, and the core is movably disposed within the axial bore. The primary coil is wound on the bobbin and is adapted to be electrically excited with an excitation signal. The secondary coils are disposed adjacent to the primary coil, and is inductively coupled to the primary coil upon electrical excitation of the primary coil. The housing surrounds at least portions of the bobbin, the core, the primary coil, and the secondary coils. The primary coil is wound on the bobbin such that the primary coil has a cross section shape that is an isosceles trapezoid, and each secondary coil has a cross section shape that is a right triangle.

Furthermore, other desirable features and characteristics of the differential transformer position sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
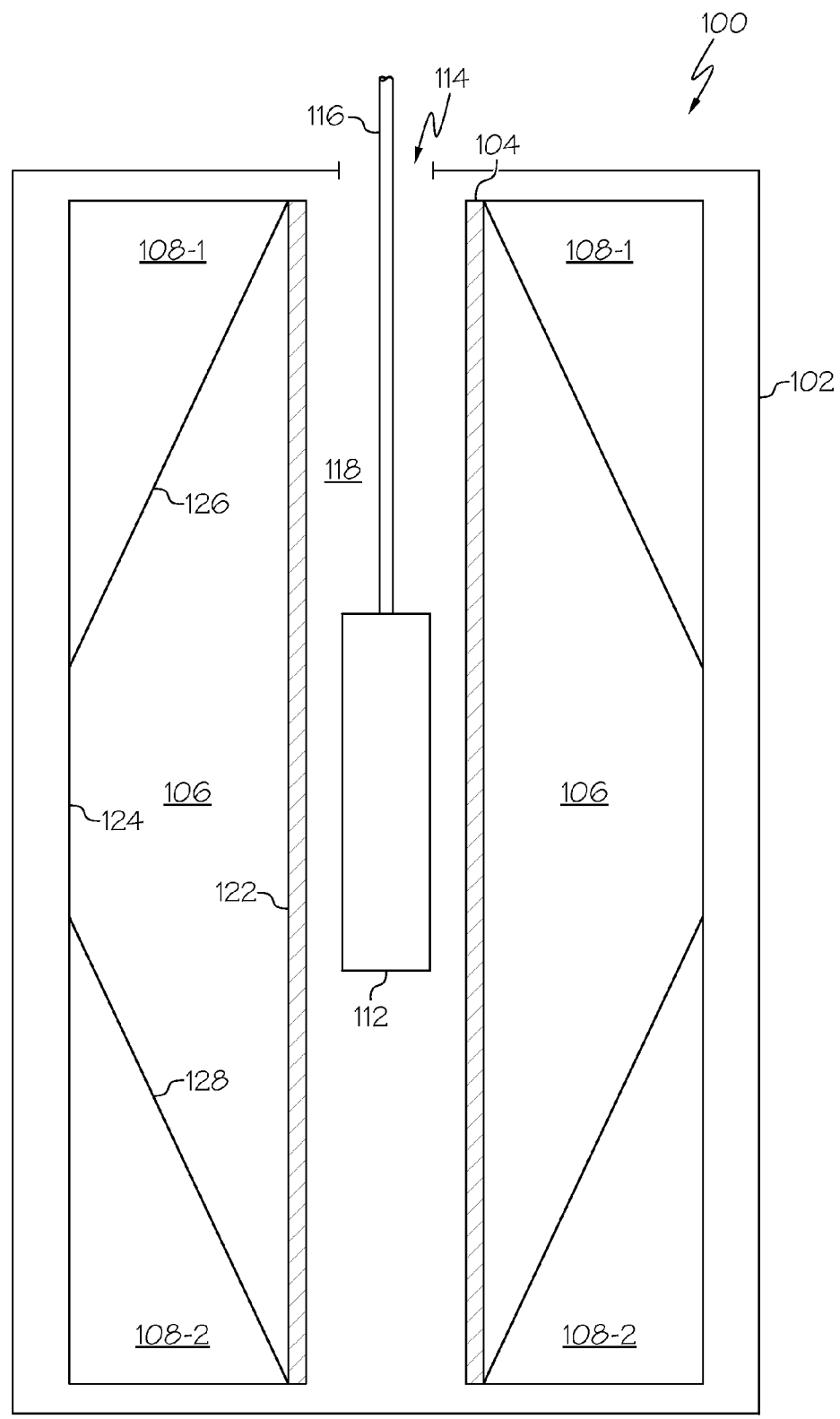
FIG. 1 depicts a simplified cross section view of one embodiment of a variable differential transformer position sensor.

Referring first to FIG. 1, a simplified cross section view of one embodiment of a variable differential transformer position sensor 100 is depicted. The depicted sensor 100 includes a housing 102, a bobbin 104, a primary coil 106, and a pair of secondary coils 108 (108-1, 108-2), and a core 112. The housing 102 surrounds at least a portion of the bobbin 104, the primary coil 106, the secondary coils 108, and the core 112. The housing 102 preferably has an opening 114 in at least one end, through which a rod 116 or other suitable device extends and is coupled to the core 112.

The bobbin 104 has an axial bore 118 formed therein. It will be appreciated that the bobbin 104 may be formed of any one of numerous known materials. For example, it may be formed of any one of numerous known metals or metal alloys, or it may be formed of any one of numerous known plastic compositions.

The primary coil 106 is wound on the bobbin 104 and is adapted to be electrically excited with an excitation signal from a non-illustrated excitation signal source. The secondary coils 108 are disposed adjacent to the primary coil 106 such that each secondary coil 108 is inductively coupled to the primary coil 106 when the primary coil 106 is electrically excited. As a result, when the primary coil 106 is electrically excited with an excitation signal, the secondary coils 108 supply an output signal to a non-illustrated load.

The core 112 is movably disposed within the axial bore 118 and, as noted above, is coupled to the rod 116 (or other suitable device). The core 112 may be formed of any one of numerous known magnetically permeable materials and, in response to movement of the rod 116, translates axially within the axial bore 118. As is generally known, axial translation of the core 112 causes variations in the output signal supplied from the secondary coils 108. This variation in the output signal can, for example, be representative of the position of a device that is coupled, via the rod 116, to the core 112.

Still referring to FIG. 1, it is seen that the primary coil 106 is wound on the bobbin 104 such that it has cross sectional shape that is a non-parallelogram. More specifically, the primary coil 106 is wound such that it has a cross section shape that is a trapezoid. As is generally known, a trapezoid has two parallel sides—a longer side 122, and a shorter side 124—and two non-parallel sides 126, 128. Although the cross section shape may be various trapezoid shapes, in a particular preferred embodiment the cross section shape is that of an isosceles trapezoid. This, as is also generally known, means that the non-parallel sides 126, 128 are equal in length.

In addition to the primary coil 106 being wound such that it has a non-parallelogram shaped cross section, the secondary coils 108 are wound such that each has a triangular cross section shape. Preferably, as FIG. 1 further depicts, the secondary coils 108 are wound around a different one of the non-parallel sides 126, 128 of the trapezoidal cross section of the primary coil 106. Moreover, each secondary coil 108 is preferably wound such that the cross section shape of each is a right triangle.

The cross section shapes of the primary and secondary coils 106, 108 provide several distinct advantages over presently known differential transformer position sensors. Specifically, the trapezoidal cross section shape of the primary coil 106 allows for a relatively higher number of primary coil turns, which provides a higher input impedance to meet input power requirements. The triangular cross section shape of the secondary coils 108 provides improved inductive coupling with both the primary coil 106 and the core 112, which improves output voltage and phase shift. These cross section shapes also take up less space, which allows for relatively shorter form factors (e.g., smaller space envelope) to be achieved. Lower gage (i.e., thicker) wire can be used, which allows for better manufacturing control and thus to better yield. Moreover, for a given package size (e.g., space envelope), relatively higher sensitivity and improved linearity can be achieved.

Figure 2:
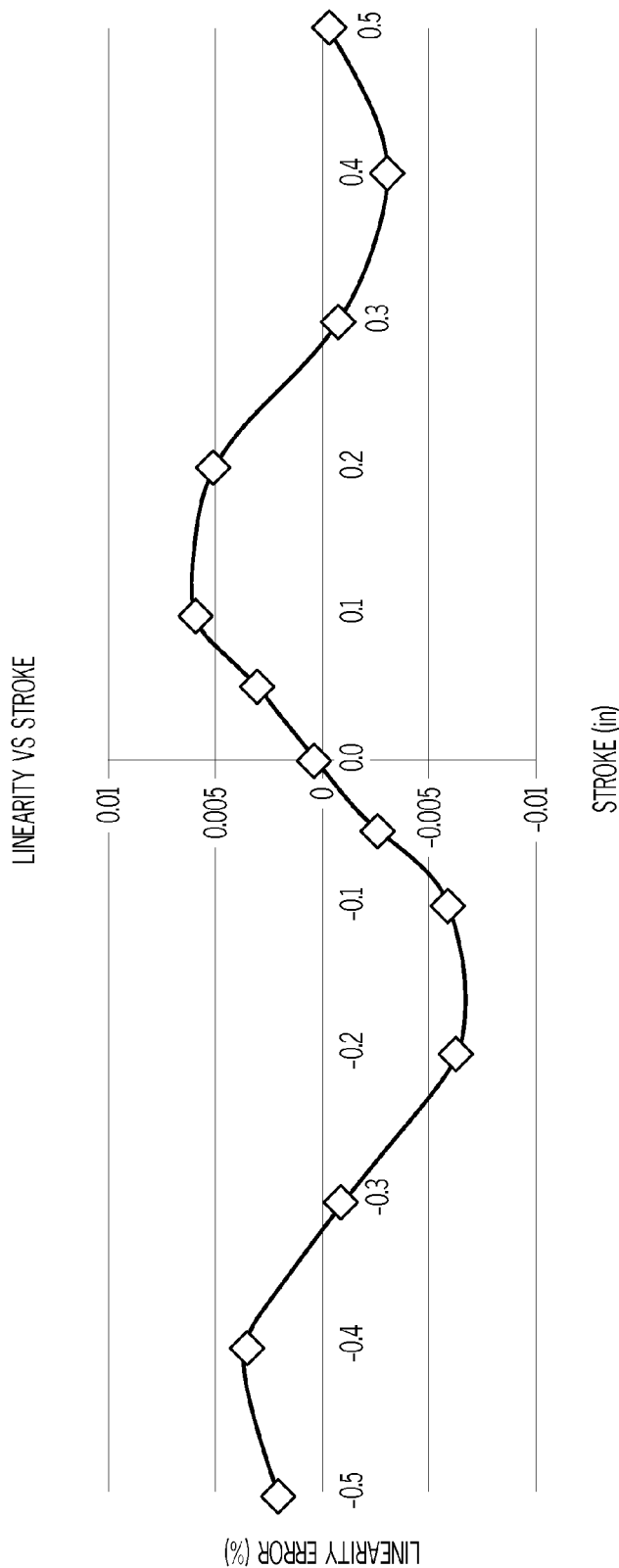
FIGS. 2-4 depict simulation results for an embodiment of the differential transformer position sensor of FIG. 1 with a metal bobbin.
Figure 3:
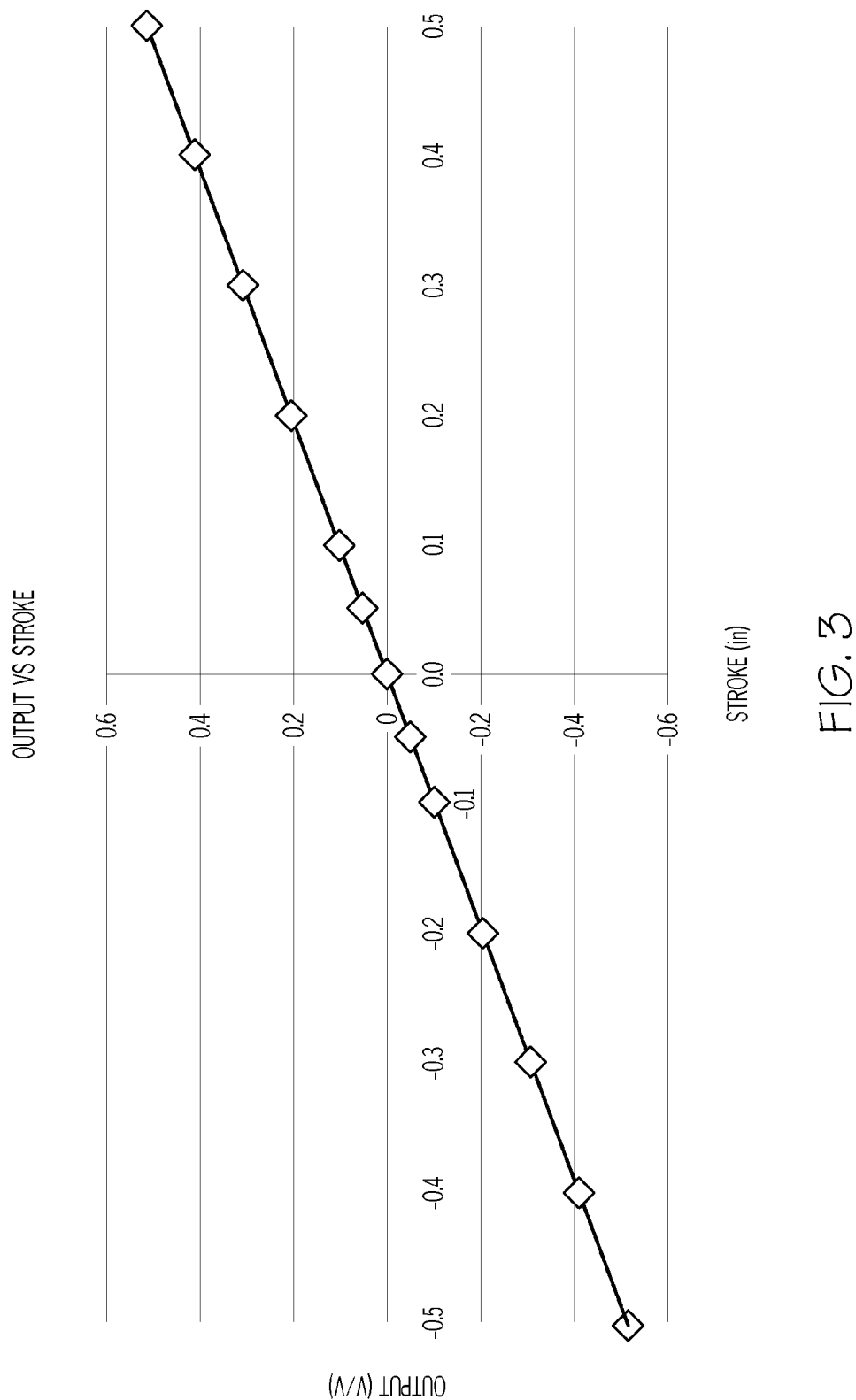
Figure 4:
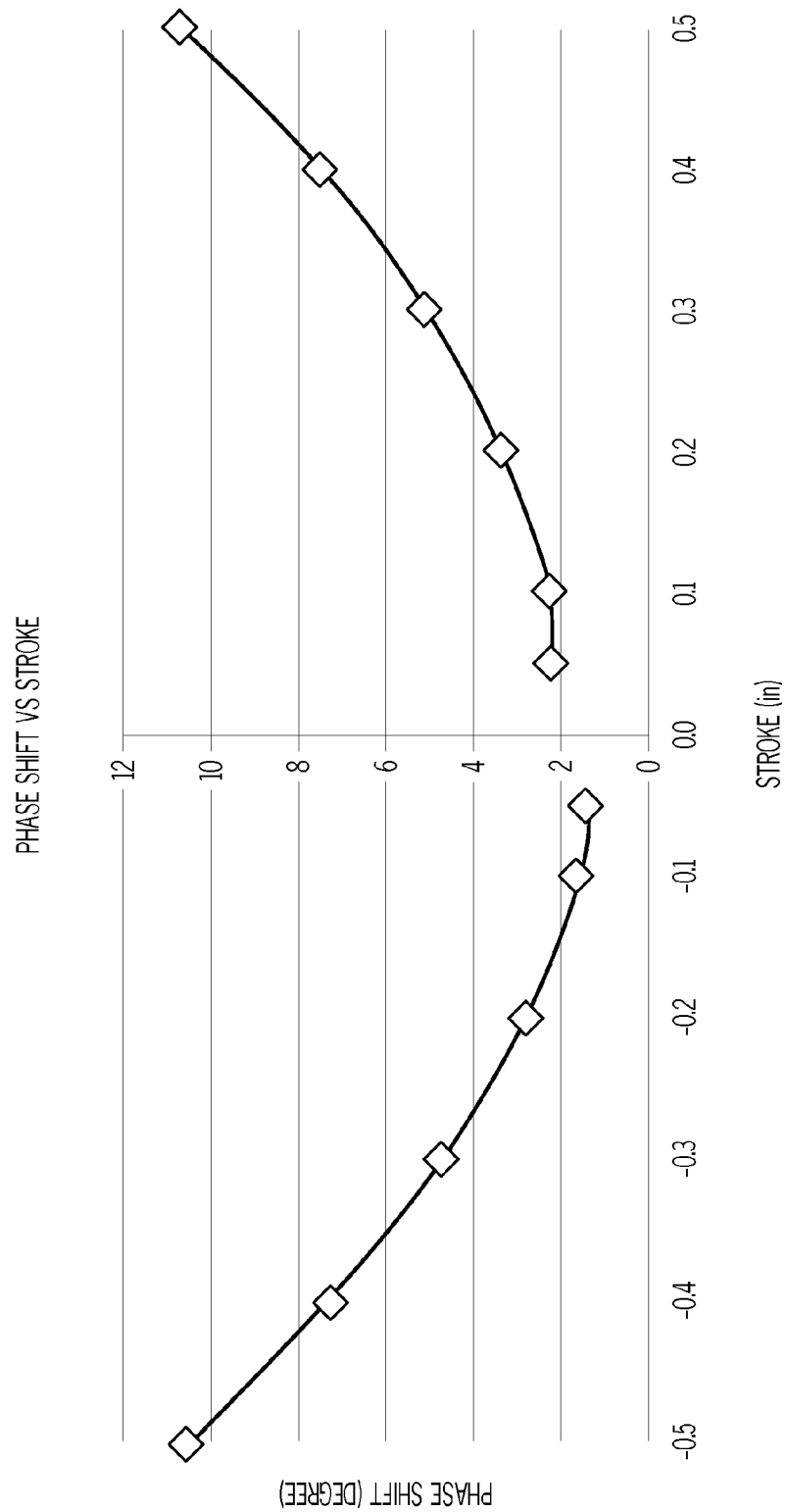
Figure 5:
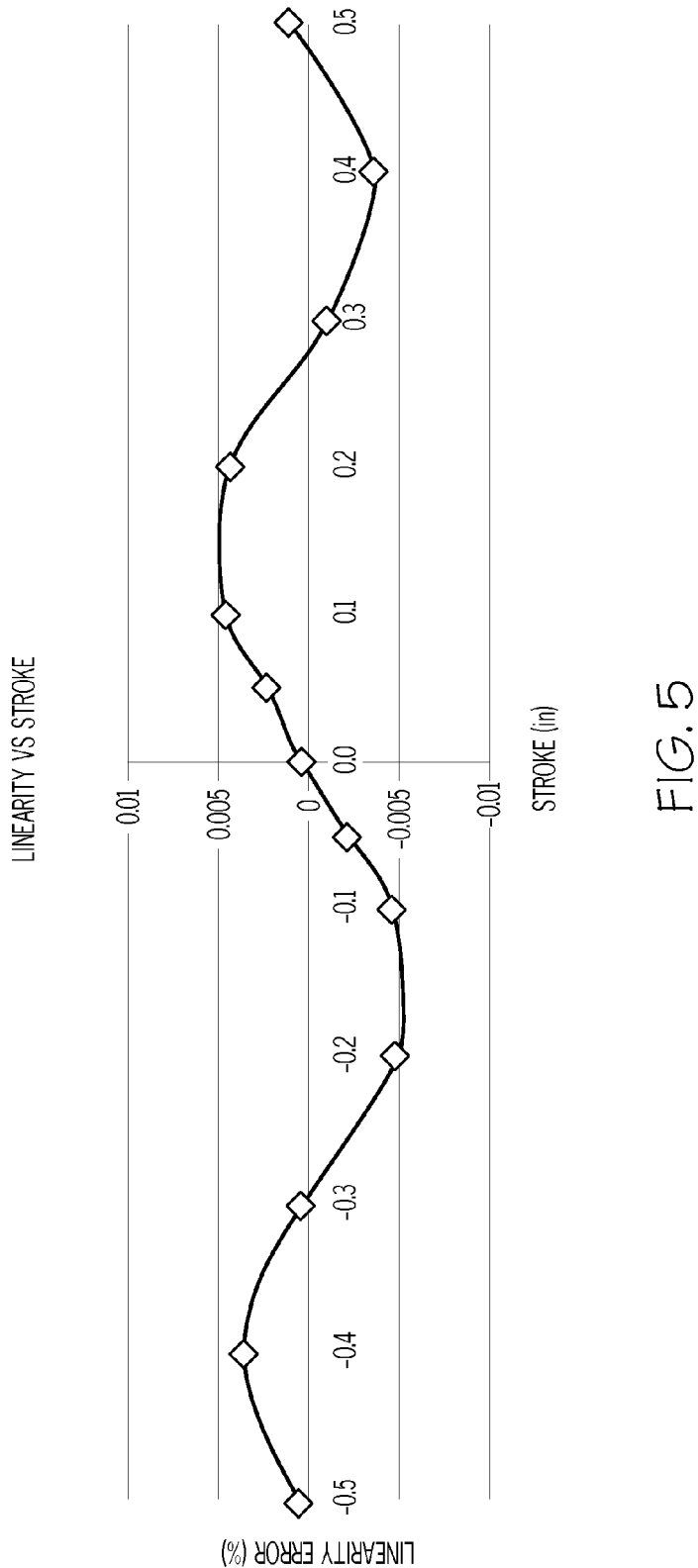
FIGS. 5-7 depict simulation results for an embodiment of the differential transformer position sensor of FIG. 1 with a plastic bobbin.
Figure 6:
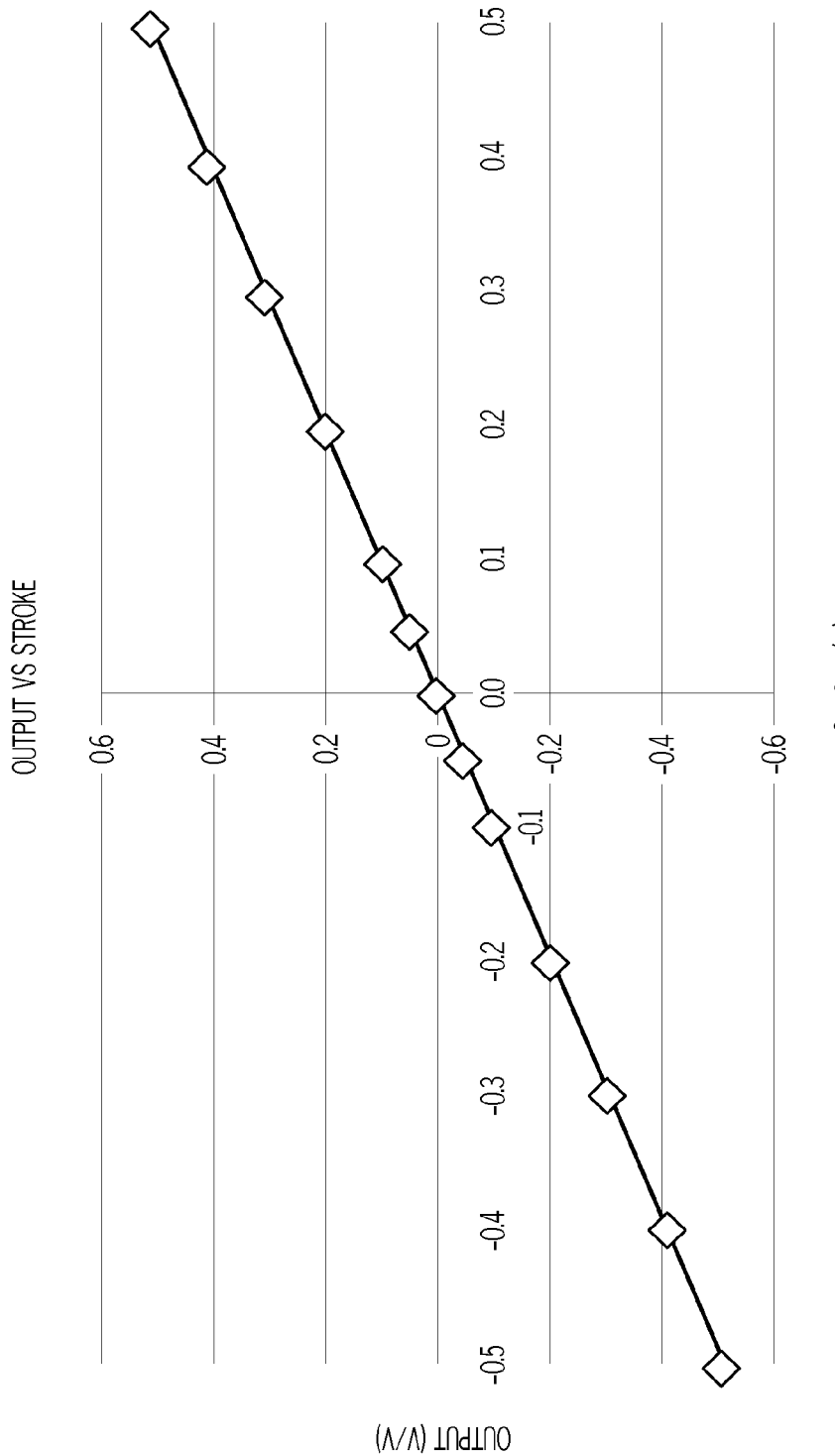
Figure 7:
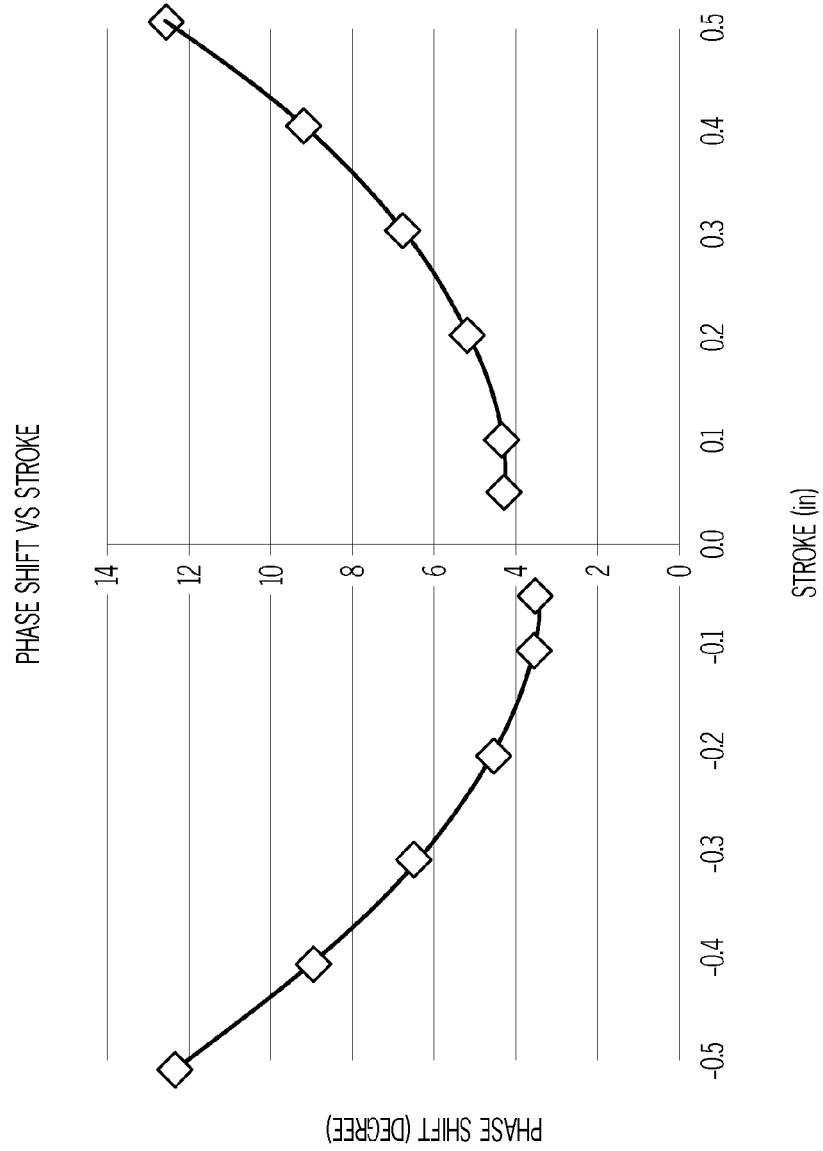
Figure 8:
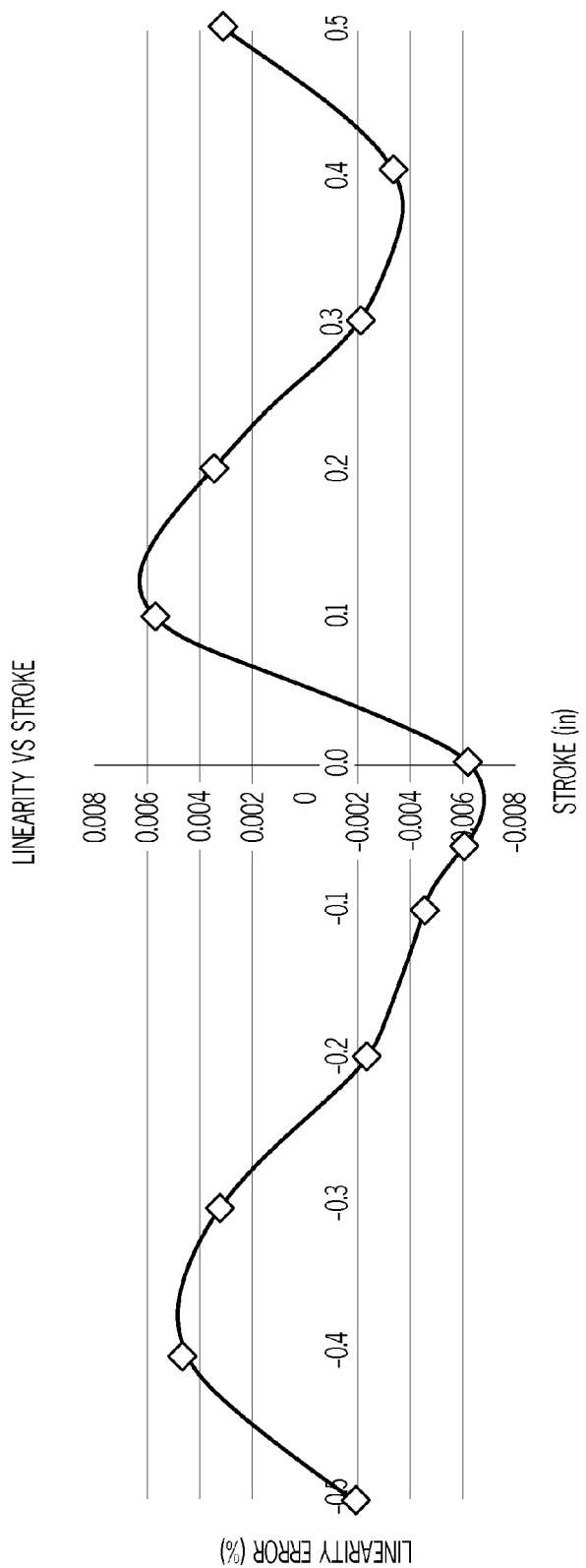
FIGS. 8-10 depict actual physical results for an embodiment of the differential transformer position sensor of FIG. 1.
Figure 9:
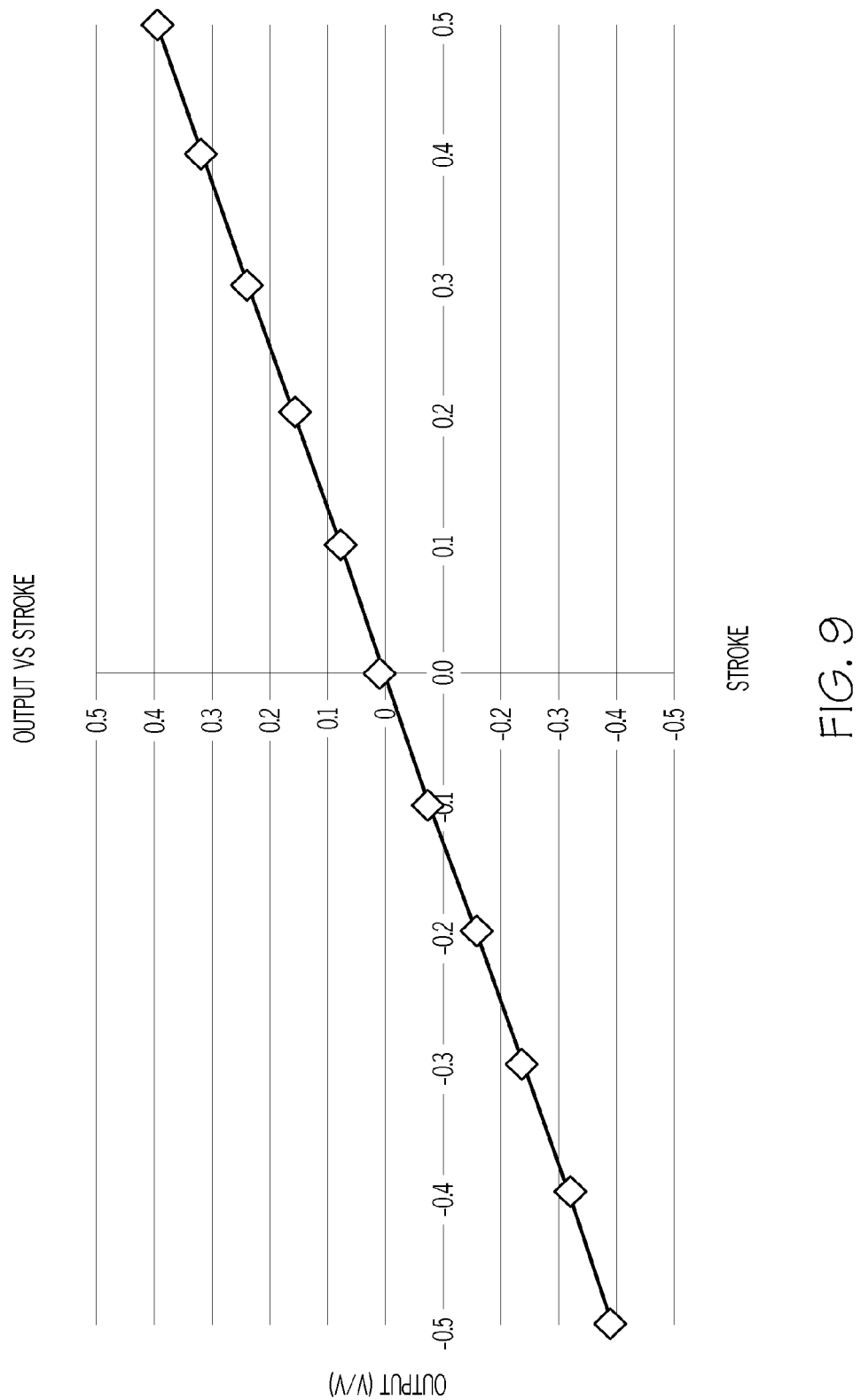
Figure 10:
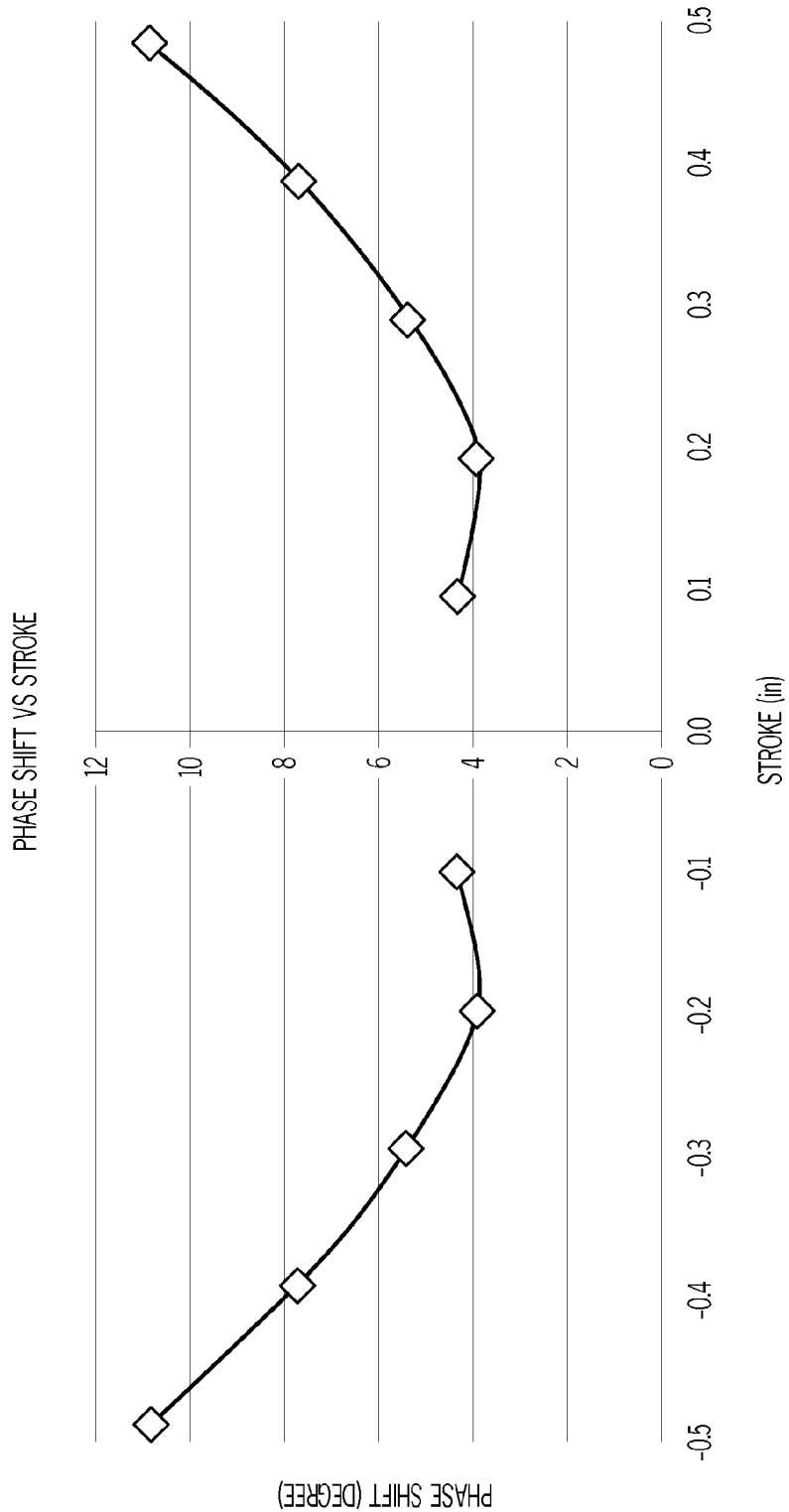

To provide some specific examples of the above improvements, it has been shown that when primary coil 106 is wound such that it has a trapezoidal cross section, the differential transformer position sensor exhibits an improvement in linearity by about 3 times over that of presently known sensors. The size envelope can be reduced by around 15%, input power consumption is reduced by about 200%, input DC resistance and impedance is improved by about 50%, and the overall manufacturing process time is improved by about 10%. Examples of the improvements in linearity, input power, and phase shift are illustrated in FIGS. 2-10. It should be noted that the graphs depicted in FIGS. 2-4 are simulation results for a differential transformer position sensor 100 with a metal bobbin 104, the graphs depicted in FIGS. 5-7 are simulation results for a differential transformer position sensor 100 with a plastic bobbin 104, and the graphs depicted in FIGS. 8-10 are actual physical results for a prototype differential transformer position sensor 100 with the primary and second coils 106, 108 wound as described herein.

It should be further noted that the dimensions of the trapezoidal cross section shape of the primary coil 106 may be varied to achieve desired and/or optimal performance. In particular, and with reference once again to FIG. 1, it may be appreciated that for a given length of the longer parallel side 122, the length of the shorter parallel side 124 may be varied to achieve a desired and/or optimal performance. Any variation in the length of the shorter parallel side 124 will, of course, vary the appropriate dimensions of the triangular cross section shapes of the secondary coils 108.

Figure 11:
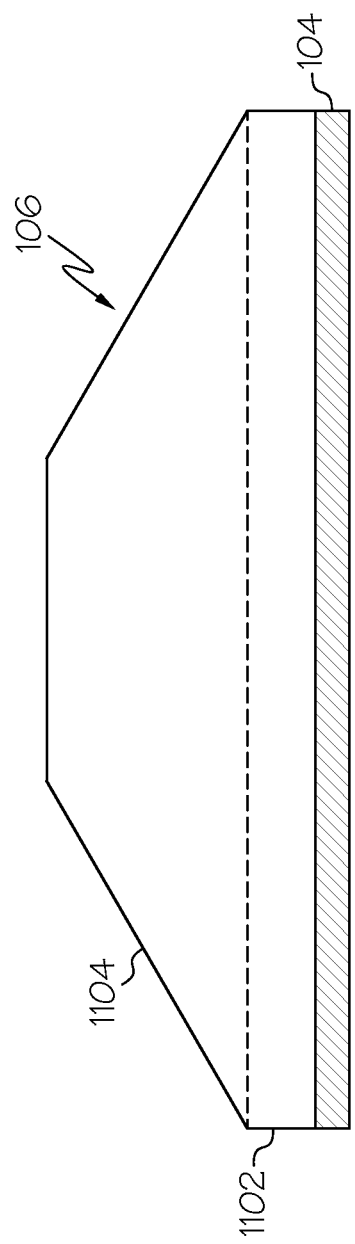
FIG. 11 depicts a simplified cross section view of a primary coil wound on a bobbin and that may be used to implement a variable differential transformer position sensor.

It was noted above that the primary coil 106 is preferably wound on the bobbin 104 such that it has cross sectional shape that is a non-parallelogram, such as a trapezoid. It will be appreciated that the primary coil 106 may, in some embodiments, be wound on the bobbin 104 such that only a portion of the coil 106 is wound such that its cross section shape is a non-parallelogram, such as a trapezoid. Such an embodiment is depicted in FIG. 11, in which the primary coil 106 is wound on the bobbin 104 such that a first portion 1102 has a cross sectional shape that is a parallelogram, such as a rectangle, and a second portion 1104 has a cross sectional shape that is a non-parallelogram, such as a trapezoid.

The differential transformer position sensor 100 described herein exhibits improved linearity, phase shift, power consumption, and accuracy relative to known sensors, while still meeting the size requirements associated with various aerospace industry applications.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A transformer, comprising:
   a bobbin having an axial bore formed therein, wherein the axial bore is positioned to extend in a direction of a longitudinal axis of the bobbin;
   a primary coil wound on the bobbin and adapted to be electrically excited with an excitation signal; and
   a pair of secondary coils disposed adjacent to the primary coil, the secondary coils inductively coupled to the primary coil upon electrical excitation of the primary coil,
   wherein the primary coil is wound on the bobbin such that a portion of the primary coil between the bobbin and the pair of secondary coils has a cross section that is of a trapezoid shape, wherein the cross section is parallel to and passes through the longitudinal axis of the bobbin.

2. The transformer of claim 1, wherein each secondary coil has the cross section shape that is a triangle.

3. The transformer of claim 1, wherein the trapezoid shape is an isosceles trapezoid shape.

4. The transformer of claim 3, wherein each secondary coil has a cross section shape that is a right triangle.

5. The transformer of claim 1, wherein:
   the trapezoid shape has two parallel sides and two non-parallel sides; and
   each of the secondary coils is wound around a different one of the non-parallel sides.

6. The transformer of claim 5, wherein each secondary coil has a cross section shape that is a triangle.

7. The transformer of claim 5, wherein the trapezoid shape is an isosceles trapezoid shape.

8. The transformer of claim 7, wherein each secondary coil has a cross section shape that is a right triangle.

9. The transformer of claim 1, wherein the primary coil is wound on the bobbin such that:
   a first portion of the primary coil has a cross section shape that is a rectangle; and
   a second portion of the primary coil has a cross section shape that is a trapezoid.

10. A linear variable differential transformer position sensor, comprising:
    a bobbin having an axial bore formed therein, wherein the axial bore is positioned to extend in a direction of a longitudinal axis of the bobbin;
    a core movably disposed within the axial bore;
    a primary coil wound on the bobbin and adapted to be electrically excited with an excitation signal; and
    a pair of differentially wound secondary coils disposed adjacent to the primary coil, each secondary coil inductively coupled to the primary coil upon electrical excitation of the primary coil,
    wherein the primary coil is wound on the bobbin such that a portion of the primary coil between the bobbin and the pair of secondary coils has a cross section that is of a trapezoid shape, wherein the cross section is parallel to and passes through the longitudinal axis of the bobbin.

11. The linear variable differential transformer position sensor of claim 10, wherein each secondary coil has the cross section shape that is a triangle.

12. The linear variable differential transformer position sensor of claim 10, wherein the trapezoid shape is an isosceles trapezoid shape.

13. The linear variable differential transformer position sensor of claim 11, wherein each secondary coil has the cross section shape that is a right triangle.

14. The linear variable differential transformer position sensor of claim 10, wherein:
    the trapezoid shape has two parallel sides and two non-parallel sides; and
    each of the secondary coils is wound around a different one of the non-parallel sides.

15. The linear variable differential transformer position sensor of claim 14, wherein each secondary coil has a cross section shape that is a triangle.

16. The linear variable differential transformer position sensor of claim 14, wherein the trapezoid shape is an isosceles trapezoid shape.

17. The linear variable differential transformer position sensor of claim 16, wherein each secondary coil has a cross section shape that is a right triangle.

18. The linear variable differential transformer position sensor of claim 10, wherein the primary coil is wound on the bobbin such that:
    a first portion of the primary coil has a cross section shape that is a rectangle; and
    a second portion of the primary coil has a cross section shape that is a trapezoid.

19. A linear variable differential transformer position sensor, comprising:
    a bobbin having an axial bore formed therein, wherein the axial bore is positioned to extend in a direction of a longitudinal axis of the bobbin;
    a core movably disposed within the axial bore;
    a primary coil wound on the bobbin and adapted to be electrically excited with an excitation signal;
    a pair of differentially wound secondary coils disposed adjacent to the primary coil, each secondary coil inductively coupled to the primary coil upon electrical excitation of the primary coil; and a housing surrounding at least portions of the bobbin, the core, the primary coil, and the secondary coils, wherein:

the primary coil is wound on the bobbin such that a portion of the primary coil between the bobbin and the pair of secondary coils has a cross section that is of an isosceles trapezoid shape, wherein the cross section is parallel to and passes through the longitudinal axis of the bobbin, and each secondary coil has a cross section shape that is a right triangle.

20. The linear variable differential transformer position sensor of claim 19, wherein:

the isosceles trapezoid shape has two parallel sides and two non-parallel sides; and each of the secondary coils is wound around a different one of the non-parallel sides.

* * * * *